United States Patent [19]

Peterson et al.

[11] Patent Number: 5,115,195

[45] Date of Patent: May 19, 1992

[54] SYSTEM AND METHOD FOR MEASURING THE ABSOLUTE POSITION OF ONE BODY WHICH IS CONSTRAINED TO MOVE WITH RESPECT TO ANOTHER BODY

[75] Inventors: Wade D. Peterson, Morrisville, N.C.; Joachim Hellwig; Rainer Heuckelbach, both of Lüdenscheid, Fed. Rep. of Germany

[73] Assignee: MTS Systems Corporation, Minneapolis, Minn.

[21] Appl. No.: 644,273

[22] Filed: Jan. 22, 1991

[51] Int. Cl.⁵ .............................................. G01B 7/14
[52] U.S. Cl. ........................ 324/207.13; 324/207.11; 324/207.22; 324/207.24
[58] Field of Search .............. 324/207.11, 207.12, 324/207.13, 207.14, 207.15, 207.16, 207.17, 207.18, 207.2, 207.21, 207.22, 207.24

[56] References Cited

U.S. PATENT DOCUMENTS

| | | |
|---|---|---|
| 3,154,946 | 11/1964 | Ordorica et al. |
| 3,505,576 | 4/1970 | Burkhart |
| 3,526,857 | 9/1970 | Dickinson |
| 3,898,555 | 8/1975 | Tellerman |
| 4,000,651 | 1/1977 | Christiansen |
| 4,005,396 | 1/1977 | Fujiwara et al. |
| 4,071,818 | 1/1978 | Krisst |
| 4,282,485 | 8/1981 | Pauwels et al. |
| 4,298,861 | 11/1981 | Tellerman |
| 4,359,677 | 11/1982 | Dennon |
| 4,404,523 | 9/1983 | Hughes et al. |
| 4,504,832 | 3/1985 | Conte |
| 4,589,038 | 5/1986 | Radtke |
| 4,654,590 | 3/1987 | Kitaura et al. |
| 4,721,902 | 1/1988 | Tellerman et al. |
| 4,726,226 | 2/1988 | Tellerman |
| 4,757,244 | 7/1988 | Iwamoto et al. |
| 4,803,427 | 2/1989 | Mason et al. |
| 4,839,590 | 6/1989 | Koski et al. |
| 4,939,457 | 7/1990 | Tellerman |

OTHER PUBLICATIONS

"A CCD Based Linear Absolute Encoder", Sensors, Jun. 1990.

Primary Examiner—Walter E. Snow
Attorney, Agent, or Firm—Merchant, Gould, Smith, Edell, Welter & Schmidt

[57] ABSTRACT

A system and method for measuring the absolute position of one body which is constrained to move with respect to another body includes a plurality of magnetic identification units, which are adapted to be mounted in a predetermined absolute position on a first body. Each of the magnetic identification units has an identity characteristic that is associated therewith. A Sensor having a transducer is adapted to be fixed to a second body. The transducer is adapted to sense (a) the relative distance of at least one of the magnetic identification units with respect to a benchmark location which is fixed relative to the transducer and the second body. It is also equipped to sense the identity characteristic of the sensed unit. A controller is provided to receive data representing the relative distance and identity characteristic of the sensed unit from the sensor. The controller identifies the sensed unit from the identity characteristic, recalls the predetermined absolute position of the sensed unit and determines an absolute position for the benchmark location by summing the predetermined absolute position of the sensed unit with the relative distance of the sensed unit to the benchmark position.

10 Claims, 6 Drawing Sheets

SYSTEM AND METHOD FOR MEASURING THE ABSOLUTE POSITION OF ONE BODY WHICH IS CONSTRAINED TO MOVE WITH RESPECT TO ANOTHER BODY

BACKGROUND OF THE INVENTION

1. Field of the Invention

This invention relates to systems which are used to periodically measure the distance between fixed points on two or more objects which are constrained to move relative to each other. More specifically, this invention relates to a measuring device based on the Wiedemann effect which is capable of measuring longer distances, is less expensive to manufacture and which offers improved performance relative to previous systems of this type.

2. Description of the Prior Art

In modern machine tools, elevators and other mechanical systems, it is often essential to accurately and frequently measure distances between points on certain relatively movable system components. In an elevator system, for example, the position of the elevator relative to the respective floors needs to be precisely monitored and updated while the elevator is operating. In a machine tool system, the position of the tool relative to the workpiece likewise needs to be precisely and continuously monitored.

One system which has enjoyed a great deal of commercial success in applications which require relatively small distances to be monitored is the TEMPOSONICS TM system that is described in U.S. Pat. No. 3,898,555 to Tellerman. The TEMPOSONICS TM system is manufactured and marketed by the assignee of this application, MTS Systems Corporation of Minneapolis, Minnesota.

The TEMPOSONICS TM system relies upon a permanent magnet which is mounted to one body, and a transducer which is mounted on a second body that is constrained to move relative to the first body. To measure the distance between the bodies, the transducer generates a signal, and receives a return pulse that is created at the location of the permanent magnet by the Wiedemann effect. The system measures the elapsed time between the pulses, and thus calculates the relative distance between the two bodies.

While the TEMPOSONICS TM system has proven successful in short distance measurement applications, it has inherent technical limitations that prevent it from measuring distances greater than about five meters with its characteristic degree of resolution. Such systems, however, have inherent advantages over other distant measurement techniques. It is clear that a long and unfilled need has existed in the prior art for a Wiedemann effect type distance measurement system which is capable of measuring longer distances than those systems which have heretofore been known.

SUMMARY OF THE INVENTION

Accordingly, it is an object of this invention to provide a Wiedemann effect type distance measuring system that can measure longer stroke lengths than Wiedemann effect systems that have heretofore been known.

It is further an object of the invention to provide a distance measuring system for longer stroke lengths which has a relatively simple control architecture.

It is yet further an object of the invention to provide a system for measuring longer stroke lengths that has a low incremental cost per increased stroke length.

It is another object of the invention to provide an improved system for measuring linear distances that is capable of self-calibration.

It is yet further an object of the invention to provide an improved distance measuring system that has the capability of retaining absolute positioning information after power is lost.

In order to achieve these and other objects of the invention, a system according to the invention for measuring the absolute position of one body which is constrained to move with respect to another body includes a plurality of magnetic identification units which are adapted to be mounted in a predetermined absolute position on a first body, each of the units having an identity characteristic associated therewith; a sensor, having a transducer adapted to be fixed to a second body, for sensing (a) the relative distance of at least one of the magnetic identification units with respect to a benchmark location which is fixed relative to the transducer and the second body; and (b) the identity characteristic of the sensed unit; and a controller for (a) receiving data representing the relative distance and identity characteristic of the second unit from the sensor; (b) identifying the sensed unit from the differentiating characteristic data; (c) recalling the predetermined absolute position of the sensed unit and (d) determining an absolute position for the benchmark location by summing the predetermined absolute position of the sensed unit with the relative distance of the sensed unit to the benchmark position.

According to a second aspect of the invention, a method for measuring the absolute position of one body which is constrained to move with respect to another body includes the steps of (a) providing a plurality of magnetic identification units, each having an identity characteristic associated therewith, at predetermined absolute positions on a first body; (b) sensing (i) the relative distance of at least one of the magnetic identification units with respect to a benchmark location which is fixed relative to a second body; and (ii) the identity characteristic of the sensed unit; (c) identifying the sensed unit from its identity characteristic; (d) recalling the predetermined absolute position of the identified unit; (e) determining an absolute position for the benchmark location by summing the predetermined absolute position of the identified unit with the relative distance of the sensed unit to the benchmarked position.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
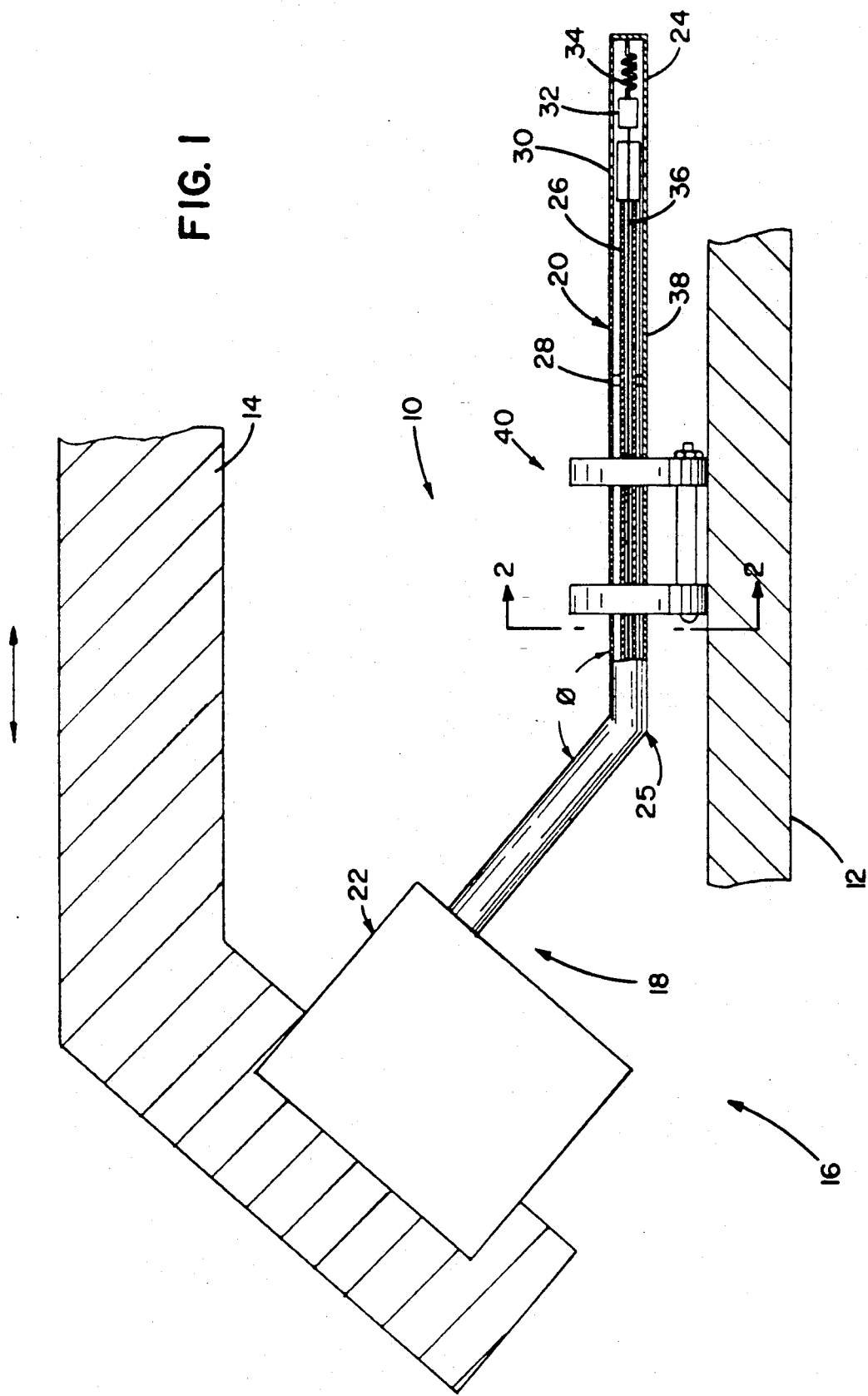
FIG. 1 is a fragmentary cross-sectional view of a system constructed according to a preferred embodiment of the invention.

Referring now to the drawings, wherein like reference numerals designate corresponding structure throughout the views, and referring in particular to FIG. 1, a system 10 according to a preferred embodiment of the invention is provided for measuring the absolute position of one body which is constrained to move with respect to another body. In the preferred embodiment, system 10 includes a magnetic identification unit 40 which is mounted to a first fixed body 12, and a sensor assembly 16 which is mounted to a second movable body 14.

As may be seen in FIG. 1, sensor assembly 16 is preferably embodied as a transducer 18 which has a first wave guide end 20 and a second signal producing end 22. The first wave guide end 20 of transducer 18 includes an elongate cylindrical beam 24 having a circular cross section which serves as the outer casing for the first wave guide end 20. According to one novel aspect of the invention, the first wave guide end 20 is bent at location 25 to enable a distal portion of wave guide end 20 to be positioned along a path which passes through an inner curvature 56 of magnetic identification unit 40 and additional magnetic identification units, which are not shown in FIG. 1. Notwithstanding the bend 25 which is provided in first wave guide end 20 and other minor details, sensor assembly 16 is identical in all relevant structure and in operation to the system which is disclosed in U.S. Pat. No. 3,898,555. The full disclosure of U.S. Pat. No. 3,898,555 is hereby incorporated by reference into the specification of this document.

Figure 2:
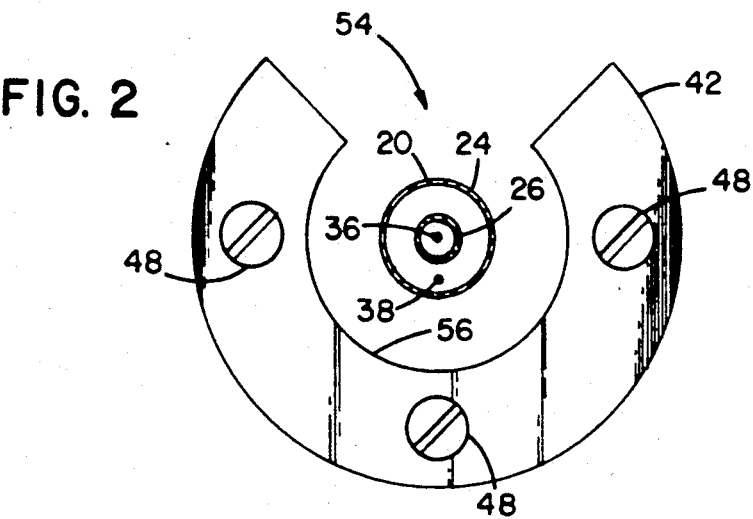
FIG. 2 is a cross-sectional view taken along lines 2—2 in FIG. 1.
Figure 4:
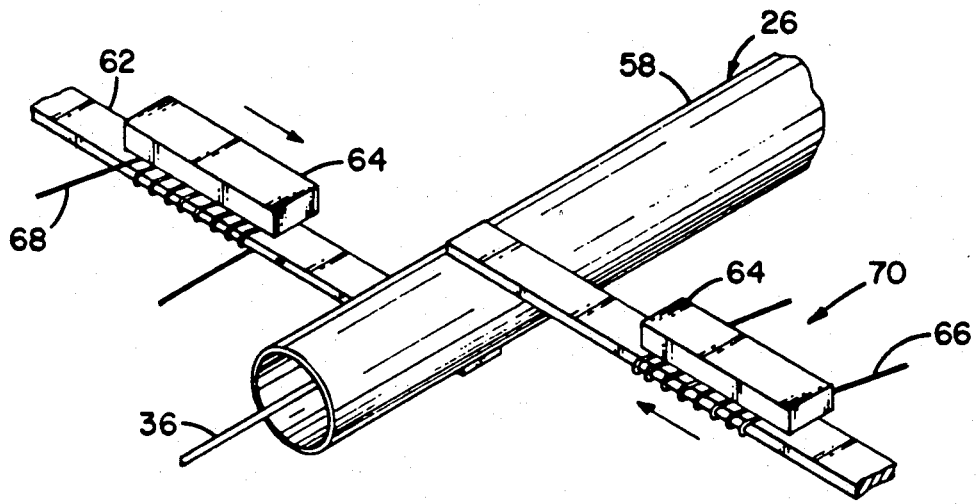
FIG. 4 is a fragmentary perspective view of one part of the transducer assembly in the embodiment of FIG. 1, the details of which are already known in the art.

As may be seen in FIGS. 1, 2 and 4, first wave guide end 20 further includes a sonic wave guide 26 that is supported periodically along the length of beam 24 by wave guide supports 28. Sonic wave guide 26 is connected to a distal end of beam 24 via a tension spring 34 which is connected to wave guide 26 via a link 32. A damping element 30 is provided on the distal end of wave guide 26 to minimize reflections of sonic pulses from the terminals of wave guide 26. Damping element 30 is embodied as a rubber pad that is clamped about wave guide 26 to effectively absorb the sonic pulses generated in the wave guide and minimize, if not totally eliminate, reflections of the generated pulses.

Looking now to FIGS. 2 and 4, sonic wave guide 26 is preferably embodied as a tubular member 58 which has an electric wire 36 centered therein. A return wire 38, which is an extension of electric wire 36, is also enclosed within beam 24 to complete to circuit back to ground.

Preferably, beam 24 is formed of a non-magnetic material so as not to effect the magnetic field associated with magnetic identification unit 40, or other magnetic identification units.

Figure 3:
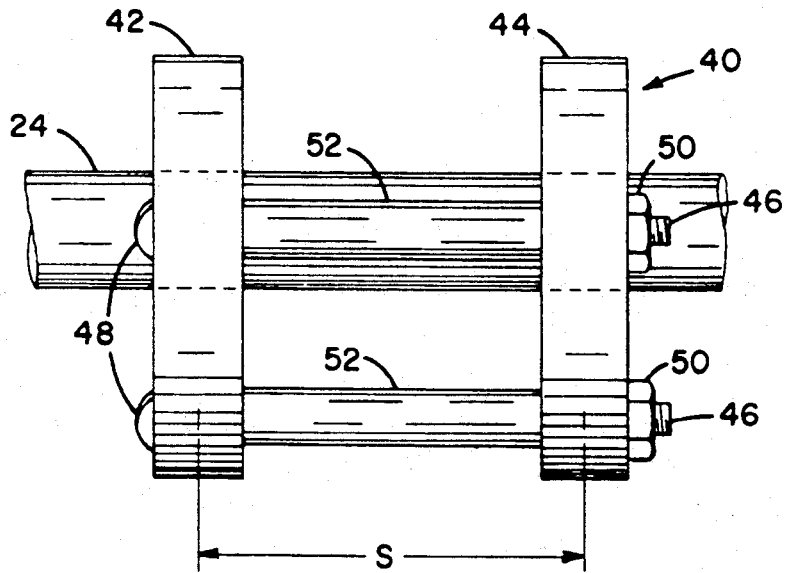
FIG. 3 is a side elevational view of one component in the system illustrated in FIGS. 1 and 2.

Referring now to FIGS. 2 and 3, magnetic identification unit 40 consists in the preferred embodiment of a first magnetic element 42 and a second magnetic element 44. The first and second magnetic elements 42, 44 are arranged in a spaced, parallel relationship by a number of bolts 46 which extend through mounting holes which are defined in the respective magnetic elements 42, 44. Bolts 46 include bolt heads 48 which are arranged to be flush against the outer surface of second magnetic element 44. A nut 50 is provided on the distal threaded end of each of the bolts 46, and is tightened so as to be flush against the outer side of first magnetic element 42. A spacing sleeve 52 is provided between the inner surfaces of the respective magnetic elements 42, 44 in such a manner that a respective bolt 46 passes therethrough. As a result, the first and second magnetic elements 42, 44 are joined in an integral identification unit 40 with a precisely calibrated predetermined distance S between the first magnetic element 42 and the second magnetic element 44.

Referring to FIG. 2, it is to be noted that each of the magnetic elements 42, 44 are U-shaped so as to have an open end 54 defined therein. Open end 54 permits unimpeded access of the first wave guide end 20 of transducer 18 so that transducer 18 is permitted to be displaced axially with respect to the magnetic elements 42, 44 within an inner curvature 56 of the magnetic elements.

As may be seen in FIG. 4, the second signal producing end 22 of transducer 18 includes a mode converter 70 having first transducer tape 60 and a second transducer tape 62, which are secured to diametrically opposite points on the outer surface of tubular member 58. A bias magnet 64 is mounted adjacent each of the first and second tapes 60, 62. A first coil 66 is helically wound about the first transducer tape 60. Similarly, a second coil 68 is helically wound around second transducer tape 62. Tapes, 60, 62 are formed of a material that provides magnetic induction changes due to mechanical strains. Through a phenomonon known as the Villari effect, the flux linkages running through coils 66, 68 are disturbed by the stress wave travelling through each of the respective coils. This generates a voltage across the sensing coils 66, 68, which is then amplified to an acceptable level by external electronics. Such materials, for example, include pure nickel, nickel iron alloys and cobalt iron alloys. The electric signals are analyzed by the system control, which is discussed in appropriate detail hereinbelow. The construction of second signal producing end 22 is described in greater detail in U.S. Pat. No. 3,898,555, the disclosure of which has already been incorporated into this specification by reference.

Figure 5:
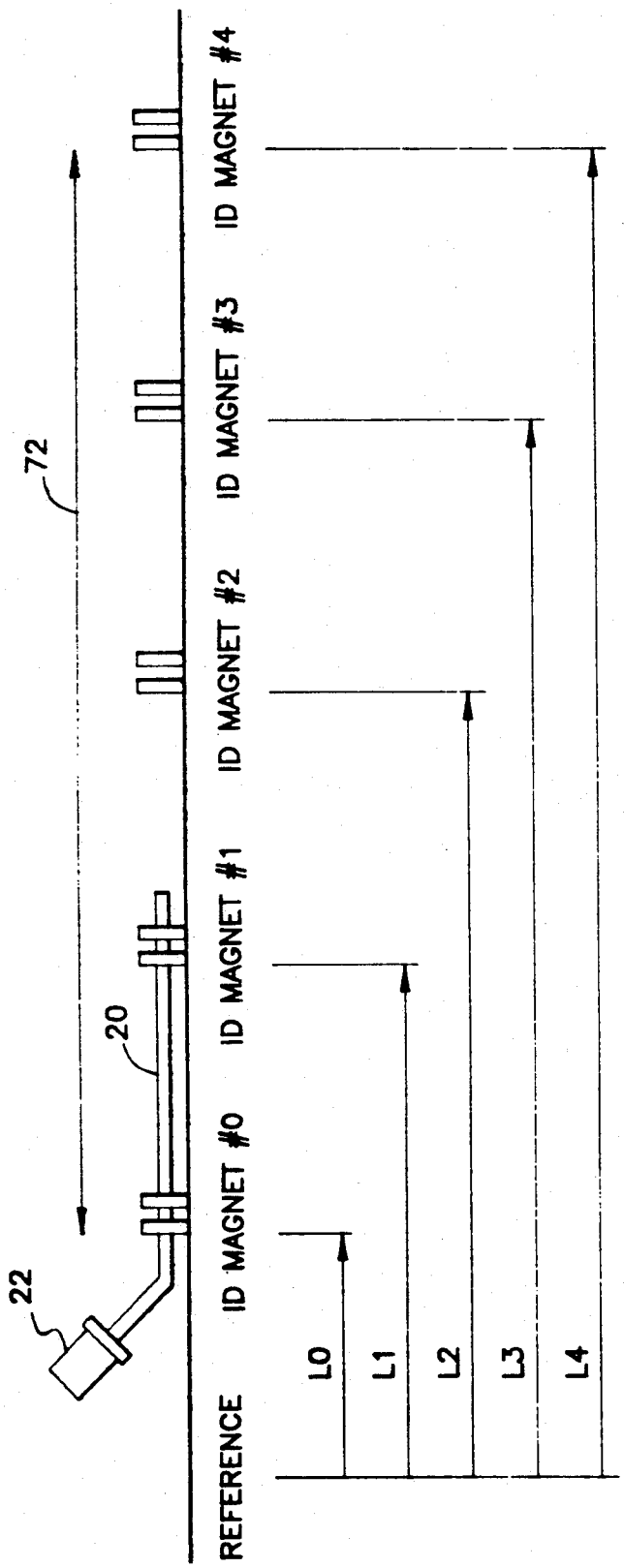
FIG. 5 is a diagrammatical depiction of different magnetic identification units used in the system of FIG. 1.

Looking now to FIG. 5, it will be seen that the transducer 18 according to the invention is attached to a movable body which is movable in the direction of arrow 72 past a plurality of different magnetic identification units on a fixed body. In FIG. 5, the different magnetic identification units are identified as ID Magnet #0, ID Magnet #1, ID Magnet #2, ID Magnet #3 and ID Magnet #4. Each of the ID Magnet #0-#4 are positioned at a location which has a predetermined distance with respect to a reference or null position on a first body, to which the ID Magnets #0-#4 are fixed. In FIG. 5, distance L0 represents the distance from the reference or null position to ID Magnet #0. L1 represents the distance from the reference position to the ID Magnet #1. L2, L3, and L4 represent the respective distances from the reference or a null position to ID Magnets #2, #3 and #4, respectively. Values L0-L4 constitute the "absolute" positions of the respective magnetic identification units #0-#4.

According to one important aspect of the invention, each of the magnetic identification units ID Magnet #0-ID Magnet #4 has a specific identity characteristic that is associated therewith. In the preferred embodiment, the identity characteristic of a specific unit constitutes the distance between the individual magnetic elements in the unit. For example, the magnetic identification unit 40 in FIGS. 1-3 has an identity characteristic S, which is the spacing between first magnetic element 42 and second magnetic element 44. If ID Magnet #0 in FIG. 5 has an identity characteristic S, ID Magnet #1 may have an identity characteristic consisting of a spacing distance equal to S+1 millimeter. ID Magnet #2 could thus have an identity characteristic consisting of a spacing distance of S+2 millimeters. ID Magnets #3 and #4 could have identity characteristics consisting of spacing distances S+3 and 4 millimeters, respectively. Of course, the incremental spacing distance is not necessarily equal to 1 millimeter, and alternative types of identity characteristics which rely on different coding methods can easily be incorporated into the invention and are considered within the scope of the invention.

Figure 6A:
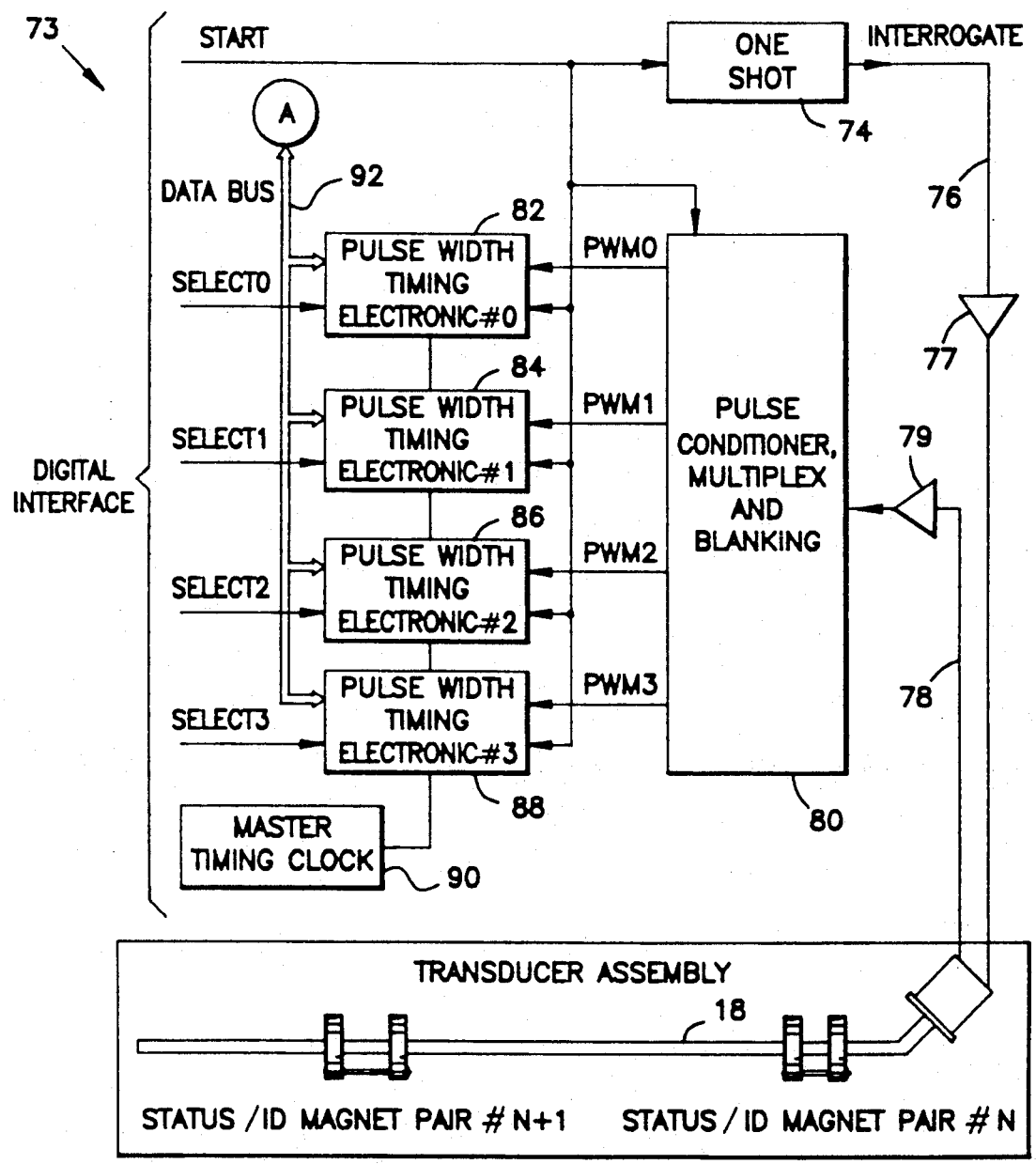
FIGS. 6A and 6B are a schematic representation of the controller system that is used in the embodiment of FIG. 1.
Figure 6B:
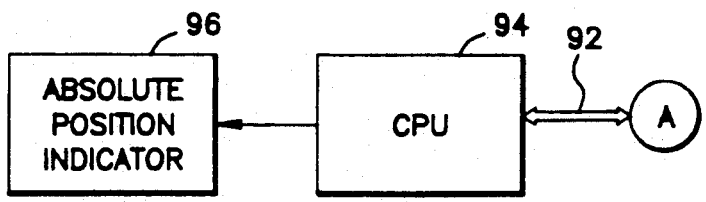

Referring now to FIGS. 6A and 6B, a preferred embodiment 73 for the controller hardware will now be disclosed. As may be seen in FIG. 6A, controller 73 includes a "one-shot", which is designed to generate a signal having a predetermined pulse width, such as one microsecond, in response to a START signal which is generated by a central processing unit 94. The START signal can be generated either automatically or in response to a manual instruction. One-shot 74 is connected to transducer 18 via an interrogation wire 76 which is electrically connected to wire 36 in transducer 18 via an amplifier 77. A return wire 78 likewise electrically connects the coils 66, 68, via a second amplifier 79, to a pulse conditioner, multiplex and blanking module 80 in controller 73. Module 80 receives input from the START signal, and is arranged to supply an output signal PWM0 to a pulse width timing electronics module #0 82, a signal PWM1 to a pulse width timing electronics module #1 84, a signal PWM2 to a pulse width timing electronics module #2 86 and a signal PWM3 to a pulse width timing electronics module #3 88. The pulse width timing electronics module #0-#3 further receive the START signal as an input, and are further connected to a master timing clock 90, as may be seen in FIG. 6A. Modules 82, 84, 86 and 88 are further adapted to receive input signals SELECT0, SELECT1, SELECT2 and SELECT3, respectively. These select lines determine which set of timing electronics 82, 84, 86 and 88 that is read by central processing unit 94, in a manner that is well known to those familiar with databus type systems. Modules 82, 84, 86 and 88 further communicate with central processing unit 94 via a databus 92, as may be seen in FIG. 6A and 6B. Central processing unit 94 is further in communication to an absolute position indicator 96, which may be a cathode ray terminal, an LED readout, or another form of indicator which may be required by a specific application. The function of the various above-described elements in controller 73 is set forth in greater detail below.

Figure 8:
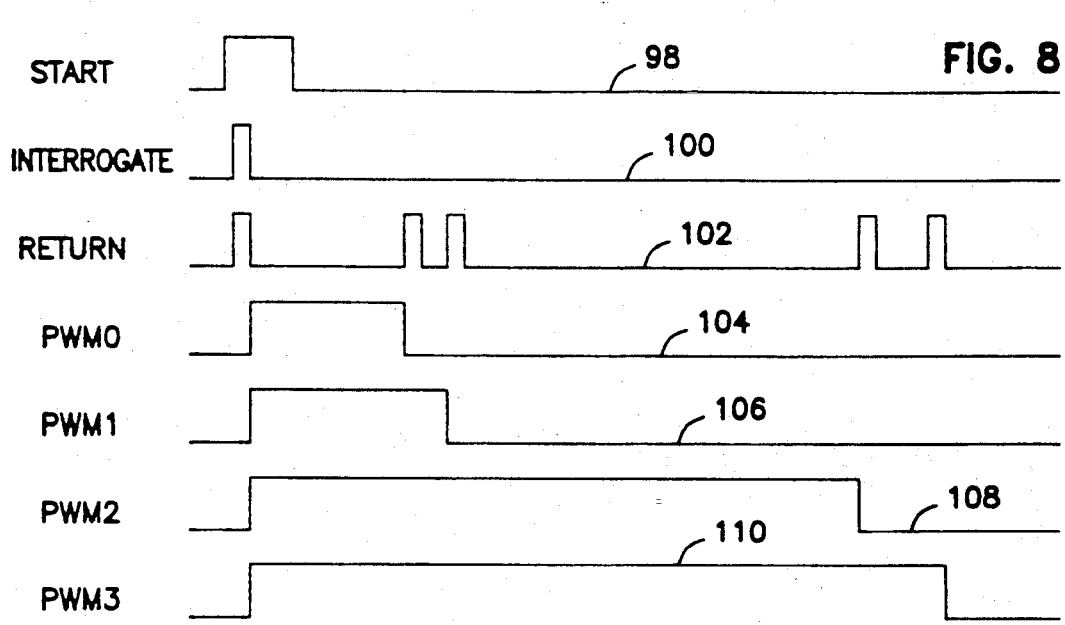
FIG. 8 is a diagrammatical depiction of the wave forms of various signals which are generated during the operation of the system constructed according to the embodiment of FIG. 1.
Figure 9:
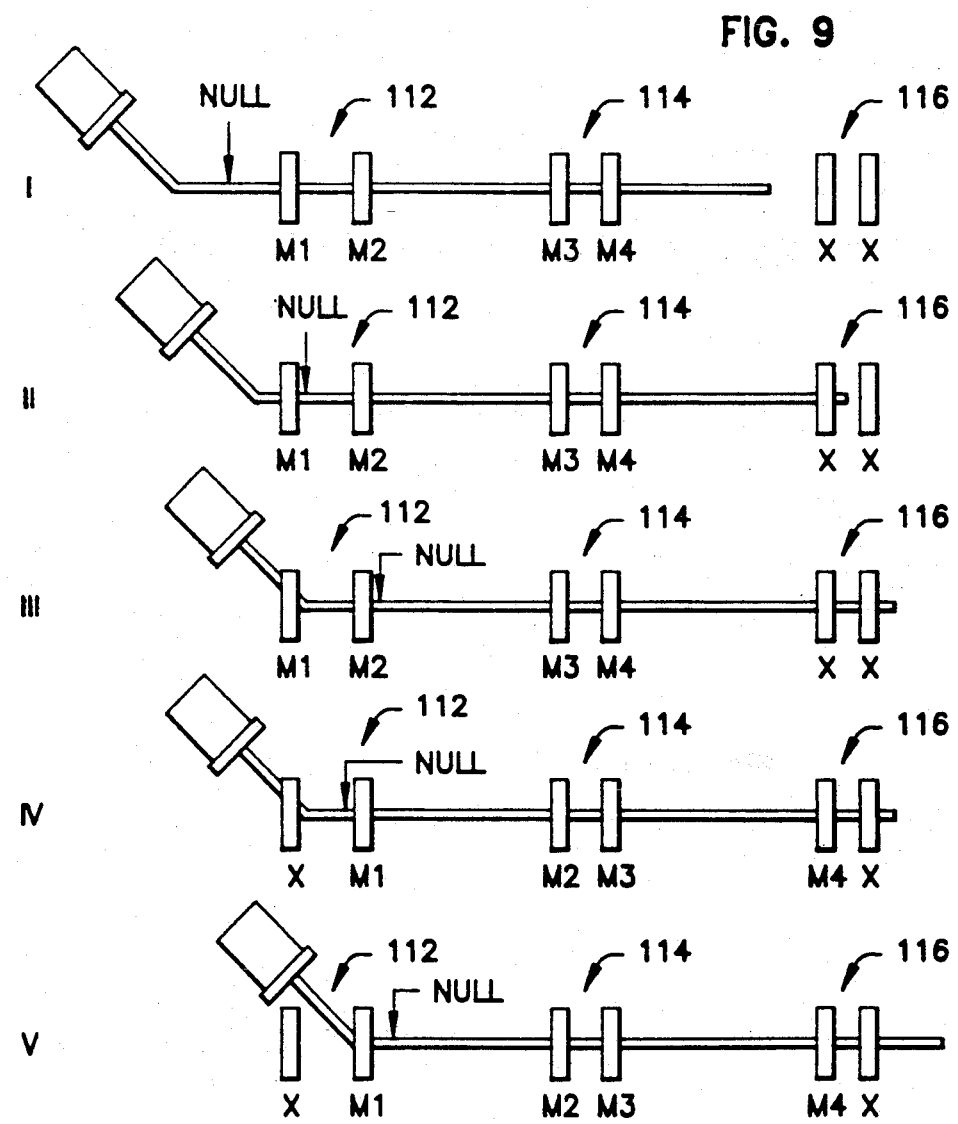
FIG. 9 is a diagrammatical depiction of the transducer according to the embodiment of FIG. 1 as it moves relative to different sets of magnetic identification units.

The operation of a system 10 according to the disclosed embodiment will now be discussed. Prior to operation, the system is calibrated to place the absolute positions L0, L1, L2, L3, L4 ... of the various magnetic identification units into a memory in CPU 94. Transducer 18 is mounted on a second movable body that is constrained to move with respect to the first body on which the magnetic identification units are mounted. Specifically, transducer 18 is positioned so that its first wave guide 20 traverses a path which passes through the spaces defined by the respective inner curvatures of the magnetic elements 42, 44 ... of the magnetic identification units. When a START signal is initiated, each of the pulse width timing electronics modules 82, 84, 86, 88 is cleared. Simultaneously, the one-shot 74 sends a one microsecond pulse to the transducer 18. The wave form of the START signal is illustrated by reference numeral 98 in FIG. 8. The one microsecond interrogation pulse is indicated by reference numeral 100 in FIG. 8. The interrogation pulse travels through wire 76, is amplified, and then is passed into wire 36 in the wave guide end 20 of transducer 18. The resultant magnetic field associated with current flow in wire 36 is a circular field and it is concentrated in wave guide element 26. The magnetic field associated with the magnetic elements in the magnetic identification units distorts the circular field associated with wire 36 to a helical field and at the same time launches a sonic torsional pulse. The torsional pulse will travel along tubular member 58 at a predetermined velocity and when it reaches tapes 60, 62 a signal will be generated in coils 66, 68, respectively, of mode counter 70. The time interval between the initial electrical pulse and the signal pulse generated in coils 66, 68 is a measure of the distance of the respective magnetic elements from a null position on the transducer 18, as is indicated in FIG. 9. The signal generated by first and second coils 66, 68 are fed to the pulse conditioner, multiplex and blanking unit 80 via wire 78. The wave form of such a return signal is indicated by reference numeral 102 in FIG. 8. The pulse conditioner, multiplex and blanking unit 80 converts the return signal to separate pulse width modulated signals PWM0, PWM1, PWM2 and PWM3. Signals PWM0, PWM1, PWM2 and PWM3 are pulse width modulated signals whose duration is proportional to the time interval between the interrogation signal 100 and the corresponding return signals from the magnets. Return signal 102 is converted to the respective pulse width modulated signals using circuitry which is familiar to those having ordinary skill in the art. These signals are fed, respectively, to the pulse width timing electronic modules 82, 84, 86 and 88. As may be seen in FIG. 8, signal PWM0 has a first pulse width, and represents the location of a first magnetic element, such as element M1 in Example I in FIG. 9. Signal PWM1 has a slightly greater pulse width, and represents a second magnetic element in the same magnetic identification unit pair, such as M2 in Example I in FIG. 9. Signal PWM2 has a pulse width that is substantially greater than the pulse width of signal PWM1. It represents the position of the first magnetic element in a different magnetic identification unit, such as magnetic element M3 in Example I in FIG. 9. Signal PWM3 has a pulse width that is slightly greater than that of signal PWM2, and represents a second magnetic element in the same identification unit, such as magnetic element M4 in Example I in FIG. 9. The pulse conditioner multiplex and blanking unit 80 is constructed so as to forward the first four return signals that it receives to the timing electronic modules 82, 84, 86, 88.

Figure 7:
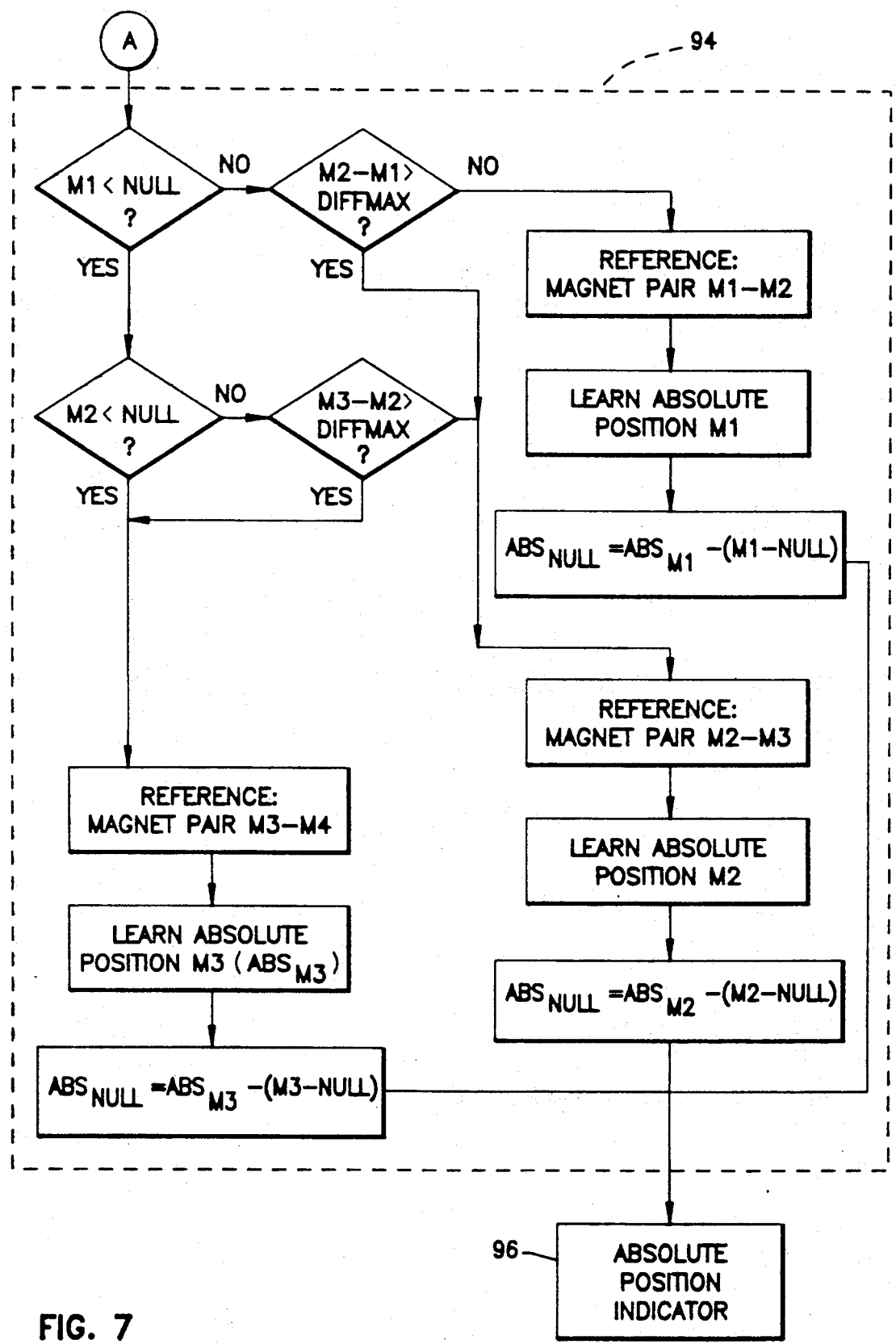
FIG. 7 is a logic flow chart which depicts the algorithm that is preferably used in the system which is constructed according to the embodiment of FIG. 1.

The period of each of the signals PWM0, PWM1, PWM2 and PWM3 is then determined by the respective pulse width timing electronics #0-#3. Signals corresponding to the respective periods are then fed digitally to the CPU 94 via databus 92. At this point, the absolute position of a null point on transducer 18 can be determined. The null position is a fixed constant that is programmed into CPU 94. Referring to the flow chart which is illustrated in FIG. 7, the CPU first calculates the respective distances of the first four sensed magnetic elements from the null position on transducer 18 from the periods corresponding to the magnetic elements which are received from the pulse width timing electronics modules 82, 84, 86 and 88. The magnetic element corresponding to signal PWM0 is identified as M1. The magnetic elements associated with signals PWM1, PWM2 and PWM3 are identified as M2, M3, and M4, respectively. As may be seen in the flow chart which is illustrated in FIG. 7, the CPU 94 first identifies which of the magnetic identification units it will use as a reference position. It identifies the selected magnetic identification unit by its identity characteristic, i.e. the spacing between its component magnetic elements. It then recalls the predetermined absolute position L0, L1, L2, L3 or L4 of the unit, and then determines an absolute position for the null position on the transducer 18 by summing the predetermined absolute position L0, L1, L2, L3 or L4 of the sensed unit with the relative distance of the sensed unit to the null position. For example, when transducer 18 is in the position illustrated by Example I in FIG. 9, CPU 94 first determines whether the position of M1 is less than null. Since it is not, the CPU then checks to see whether M2 minus M1 is greater than the greatest spacing distance between any of the magnetic elements in a magnetic identification unit or, in other words, DIFFMAX. Since it is not, the CPU 94 then selects the magnetic identification unit 112 which consists of identical elements M1 and M2 as the reference unit for its calculations. CPU 94 then extracts the pre-calibrated absolute position for magnetic element M1 from its memory. It then calculates the absolute position of the null position on transducer 18 by subtracting the known distance between M1 and the null position from the absolute position of M1. The absolute null position is then transmitted to the absolute position indicator 96 for display.

In Example II in FIG. 9, CPU 94 first determines that M1 is less than null. It then determines that the position of M2 is not less than null. It then determines that M3 minus M2 is greater than DIFFMAX. Magnet pair M3–M4 is thus selected as the reference magnetic identification unit. The CPU 94 extracts the absolute position of magnetic element M3 from its memory, and calculates the absolute null position as the absolute position of M3 minus the relative distance between M3 and the null position. The absolute null position is then sent to position indicator 96 for display.

In Example III in FIG. 9, the positions of both magnets M1 and M2 are less than null. CPU 94 thus selects magnet pair M3-M4 as the reference magnetic identification unit, and the process set forth in regard to Example II is set into motion.

In Example IV in FIG. 9, the position of the first sensed magnetic element M1 is greater than null. Since M2 minus M1 is greater than DIFFMAX, CPU 94 selects magnet pair M2-M3 as its reference identification unit. The absolute position of M2 is extracted from memory, and the absolute null position is calculated by subtracting the relative position of M2 from the null position from the absolute position of M2. The absolute null position is then sent to indicator 96 for display.

In Example V in FIG. 9, M1 is less than null, M2 is not less than null and M3-M2 is not greater than DIFFMAX. As a result, magnet pairs M2-M3 are selected as the reference magnetic identification unit, and the process discussed above with regard to Example IV is repeated. Thus, the CPU 94 can calculate the absolute null position regardless of the position of transducer 18 relative to the respective magnetic identification units 112, 114, 116. It should be understood that the foregoing examples are exemplory only, and that the invention could be used with a greater or lesser number of identification units as required by specific applications.

For a numerical example, a system 10 may be provided where the first magnetic elements in the respective magnetic identification units are positioned 1000.0 millimeters apart. CPU 94 is fed information relating to the relative position of the first four sensed magnetic elements from the null position. Based on the above algorithm, it may determine that magnetic identification unit 114 will be the reference unit. It identifies the selected unit as second magnetic identification unit 114 from the distance between the component magnetic elements therein. It extracts, from its memory the absolute position of the first magnetic element in magnetic identification unit 114, which is 2000 millimeters. From the period of the signal that corresponds to the first magnetic element in identification unit 114, it has determined that the magnetic element is located 159.4 millimeters beyond its null position. The CPU 94 would subtract the relative offset location of the null position to obtain an absolute position of 1840.6 millimeters. This value would then be transmitted to indicator 96 for display.

Figure 10:
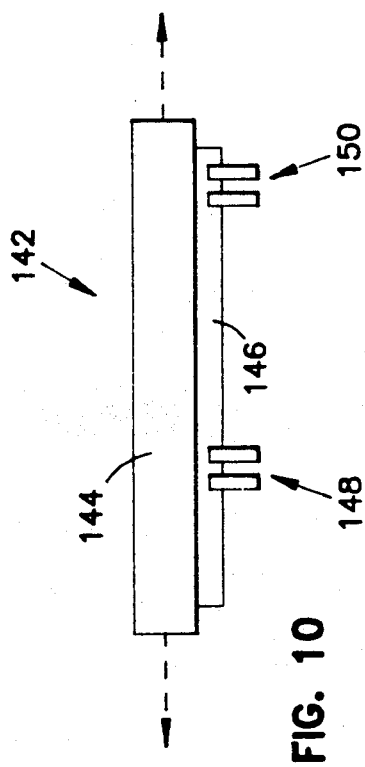
FIG. 10 is a side elevational view of a transducer which is constructed according to a second embodiment of the invention.

A second embodiment of transducer 18 is illustrated in FIG. 10. In this embodiment, a wave guide portion 146 is parallel to an offset from a signal producing portion 144. This embodiment also allows the wave guide portion 146 to pass through the open ends of magnetic identification units 148, 150 without being impeded by the bulkier section of the transducer, which is the signal producing portion 144.

A self calibrating rating scheme can also be used to simplify the setup of the system. Under normal conditions, the placement of the ID magnets must be determined by an external measurement system such as a tape measure or laser interferometer. This can be quite cumbersome in many applications. The self calibration system uses the transducer itself to determine the position of the ID magnet sets.

At setup time, the ID magnet sets are fastened to the machine, and the transducer is mounted as described above. Simple screw fasteners are used (as opposed to adjustable or precision mounting hardware). During calibration, the position of the ID magnets are determined by moving the transducer through each pair of ID magnets. This provides a "teaching mode" to determine the relative position of each ID magnet set to the previous set in the system. The absolute position of each ID magnet set is then determined from the sum of the previous sets. This data is entered into a lookup table for use at run time.

Electronic linearization of systems with ID magnets is also possible. Linearization is performed by precisely determining the position of each ID magnet pair at setup time and comparing that distance electronically with the output of the measurement system at run time. The difference between the reference and theoretical transducer position is the non-linearity at any given point. This data is placed into a software lookup table and used to adjust data points read from the measurement system at run time. Self calibration is not possible when linearization algorithms are used.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for measuring the absolute position of one body which is constrained to move with respect to another body, comprising:
   a plurality of magnetic identification units mounted in a predetermined absolute position on a first body, each of said units having an identity characteristic associated therewith;
   sensor means, having a transducer fixed to a second body, for sensing (a) the relative distance of at least one of said magnetic identification units with respect to a benchmark location which is fixed relative to said transducer and said second body; and (b) the identity characteristic of the sensed unit; and
   controller means for (a) storing said predetermined absolute positions of said magnetic identification units; (b) receiving data representing the relative distance and identity characteristic of the sensed unit from said sensor means; (c) identifying the sensed unit from the differentiating characteristic data; (d) recalling the predetermined absolute position of the sensed unit and (e) determining an absolute position for said benchmark location by summing the predetermined absolute position of the sensed unit with the relative distance of the sensed unit to the benchmark position.

2. A system according to claim 1, wherein each of said magnetic identification units comprises at least two magnetic elements.

3. A system according to claim 2, wherein said identity characteristic relates to the spacing of said magnetic elements.

4. A system according to claim 3, wherein there are two of said magnetic elements and said identity characteristic comprises the distance between said elements.

5. A system according to claim 2, wherein said magnetic elements are arranged according to a predetermined code.

6. A system according to claim 2, wherein each of said magnetic elements comprises a curved magnet that is open at one end thereof to permit unimpeded passage of said transducer.

7. A system according to claim 6, wherein said transducer comprises a first waveguide end and a second signal producing end, and wherein said first end is positioned with respect to said second end so that said first end can be positioned along a path which passes through an inner curvature of said magnetic elements.

8. A system according to claim 7, wherein said first end is bent to enable a portion thereof to be positioned along said path.

9. A system according to claim 7, wherein said first end is linearly offset from said second end to enable a portion of said first end to be positioned along said path.

10. A method for measuring the absolute position of one body which is constrained to move with respect to another body, comprising:
    (a) providing a plurality of magnetic identification units, each having an identity characteristic associated therewith, at predetermined absolute positions on a first body;
    storing said predetermined absolute position of each of said magnetic identification units;
    (c) sensing (i) the relative distance of at least one of said magnetic identification units with respect to a benchmark location which is fixed relative to a second body; and (ii) the identity characteristic of the sensed unit;
    (d) identifying the sensed unit from its identity characteristic;
    (e) recalling the predetermined absolute position of the identified unit;
    (f) determining an absolute position for said benchmark location by summing the predetermined absolute position of the identified unit with the relative distance of the sensed unit to the benchmark position.

* * * * *